United States Patent
Graf et al.

(10) Patent No.: US 6,687,607 B2
(45) Date of Patent: Feb. 3, 2004

(54) METHOD FOR CONTROLLING A DRIVE TRAIN OF A HYBRID VEHICLE

(75) Inventors: Hans-Michael Graf, Bad Abbach (DE); Rainer Knorr, Regensburg (DE); Gregor Probst, Landshut (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 10/166,815

(22) Filed: Jun. 11, 2002

(65) Prior Publication Data

US 2003/0009269 A1 Jan. 9, 2003

(30) Foreign Application Priority Data

Jun. 11, 2001 (DE) .......................... 101 282 60

(51) Int. Cl.⁷ ..................... G01C 21/26; G06F 19/00
(52) U.S. Cl. ................. 701/202; 701/22; 701/204; 701/123; 290/40 C; 290/40 D; 180/65.2; 180/65.3; 477/7
(58) Field of Search ................. 701/202, 22, 204, 701/117–123; 290/40 C, 40 D, 51; 318/139; 180/65.2, 65.3; 477/7

(56) References Cited

U.S. PATENT DOCUMENTS 5,495,912 A * 3/1996 Gray et al. ............... 180/165
5,898,282 A * 4/1999 Drozdz et al. ............ 318/139
6,209,672 B1 * 4/2001 Severinsky ............. 180/65.2
2001/0044682 A1 * 11/2001 Lutz ........................ 701/22
2002/0079853 A1 * 6/2002 Schmitz et al. .......... 318/434

FOREIGN PATENT DOCUMENTS

| DE | 19831487 | 7/1998 |
|----|----------|--------|
| DE | 19937381 | 8/1999 |
| WO | 0226520  | 9/2001 |

* cited by examiner

Primary Examiner—Thomas G. Black
Assistant Examiner—Ronnie Mancho
(74) Attorney, Agent, or Firm—Baker Botts LLP

(57) ABSTRACT

An operating strategy for the components of the drive train is defined as a function of data which characterizes a route to be traveled along. Depending on the operating strategy and the route data, expected energy consumption and a time period for which the energy can be made available are calculated. If the time period is detected as being sufficient, the drive train is controlled in accordance with the operating strategy. If the calculated time period is detected as not being sufficient, an alternative operating strategy is defined and the resulting time period is checked again.

5 Claims, 2 Drawing Sheets

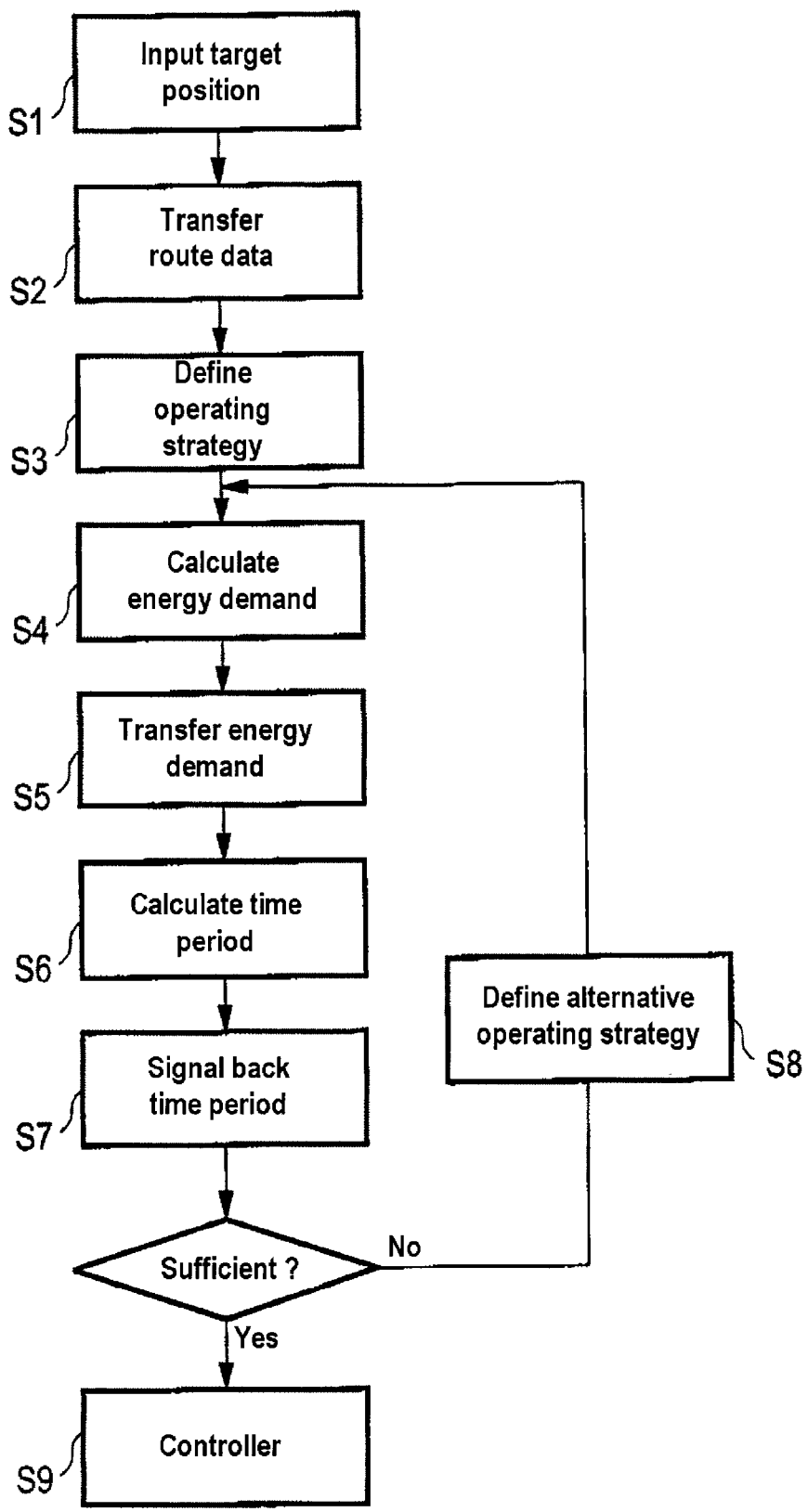

METHOD FOR CONTROLLING A DRIVE TRAIN OF A HYBRID VEHICLE

FIELD OF THE INVENTION

The invention relates to hybrid vehicles having a drive unit in addition to a conventional internal combustion engine and a control method for the energy demand required by drive train of such a vehicle.

BACKGROUND OF THE INVENTION

Future generations of vehicles will be increasingly equipped with hybrid drives. Hybrid drives have an additional drive unit alongside the conventional internal combustion engine. This additional drive unit is frequently an electric motor which is supplied with energy via a re-chargeable energy accumulator, for example a battery. In comparison to conventional drives, hybrid drives have a multiplicity of additional operating states of the drive train. In addition to a purely internal combustion engine mode, a purely electromotive mode, and a combined mode are also possible. Furthermore, a distinction can be made between operating states with charging of the battery and operating states without charging of the battery.

Energy may be stored in a hybrid vehicle in the fluid fuel, and/or in the energy accumulator. In order to use that energy as efficiently as possible, and thus avoid overdimensioning of individual components of the drive train, stringent requirements are placed on the control of the drive train. Depending on the operating state of the drive train, different quantities of energy are extracted from the fuel and the energy accumulator, or different quantities of energy are fed into the energy accumulator. In the control, consideration is to be given in particular to the fact that the characteristics of the route which is to be traveled will have an influence on the required quantity of energy, or the quantity of energy which is to be recovered.

Future generations of vehicles will frequently be equipped with a navigation system or similar components which permit the characteristics of the route which is to be traveled to be predicted, thus permitting the expected energy demand to be estimated.

DE 198 31 487 C1 discloses a method for operating a hybrid drive of a vehicle which has a battery, and in which information relating to a route to be traveled is sensed. Expected power requirements of the hybrid drive over the course of the route are calculated taking this information into account, and a timetable, which controls the control of the individual drive components or modes of operation, is determined as a function of the calculated power requirements, taking into account the levels of efficiency of the drive components or modes of operation.

SUMMARY OF THE INVENTION

The object of the present invention is to provide an optimum control for the drive train of a hybrid vehicle in terms of the energy demand, which takes into account driving situations and routes to be traveled. According to the invention, data which characterizes at least a portion of the route to be traveled is requested. Based on this data, an operating strategy is defined for the individual components of the drive train. The expected energy demand is calculated as a function of the operating strategy and of the route data. Subsequently a time period for which the calculated energy can be made available is calculated. If the calculated time period is detected as being sufficient, the individual components of the drive train are controlled in accordance with the operating strategy. If the calculated time period is, on the other hand, detected as not being sufficient, an alternative operating strategy is defined and the resulting time period is checked again.

BRIEF DESCRIPTION OF THE DRAWINGS

The invention is described herein below in greater detail in the context of an exemplary embodiment and the drawings, in which:

FIG. 2 illustrates a flowchart of a method according to the invention for controlling a drive train according to FIG. 1.

DETAILED DESCRIPTION OF THE INVENTION

Figure 1:
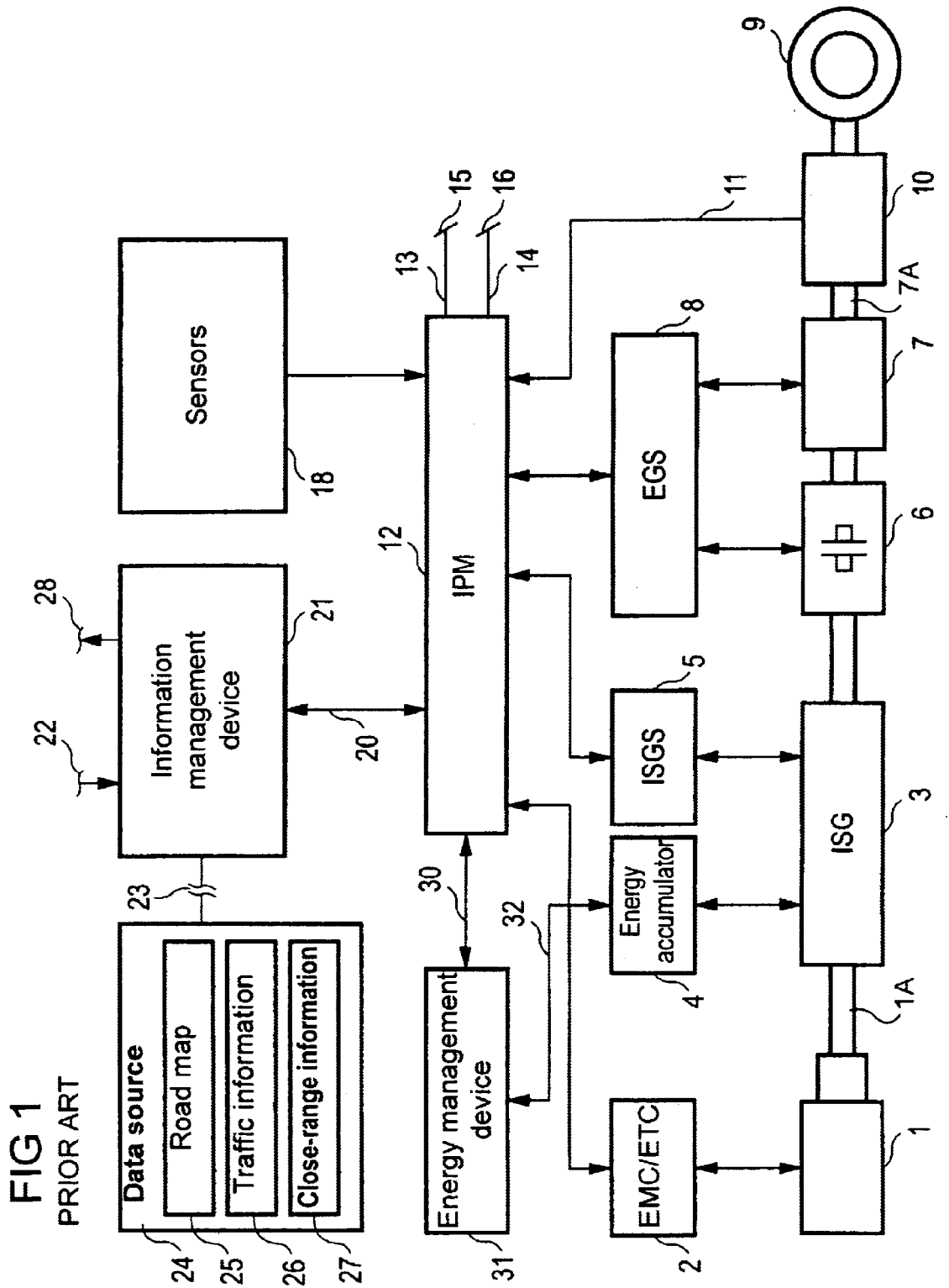
FIG. 1 illustrates a schematic view of a drive train of a hybrid vehicle.

FIG. 1 shows the drive train of a hybrid motor vehicle which is driven by an internal combustion engine 1, which is conventional in design, and therefore only illustrated schematically. The internal combustion engine 1 is controlled by an electronic engine controller (EMC) 2, which can also perform the function of an electronic throttle valve controller (ETC). At the output end, the internal combustion engine 1 is connected via a shaft 1A to an electric motor in the form of an integrated starter generator (ISG) 3, by means of which an energy accumulator 4 can be charged when the internal combustion engine 1 is running. The energy accumulator 4 is preferably as an electrochemical battery, but can also be a fuel cell, a high-power capacitor in the form of ultra-caps, or a combination of different examples of these storage technologies. The use of a plurality of energy accumulators 4 is also possible. When the internal combustion engine 1 is in a stationary state, the integrated starter generator 3 can also be used to start the internal combustion engine 1. The integrated starter generator 3 is preferably an asynchronous machine, but can also be a synchronous machine, or d.c. motor. The integrated starter generator 3 is controlled by an ISG control unit (ISGS) 5.

A clutch (not illustrated) can advantageously be arranged between the internal combustion engine 1 and the integrated starter generator 3, which permits the internal combustion engine 1 to be disconnected from the drive train. Accordingly, the rotational speed of the integrated starter generator 3 may be decoupled from the internal combustion engine 1, whereby the braking effect of the internal combustion engine 1, which only generates wasted energy, is switched off, and the braking effect of the starter generator 3, which is electrically useable, is improved.

Clutch 6 is arranged in the drive train and connects or disconnects the internal combustion engine 1 and the integrated starter generator 3 to a transmission 7. Clutch 6 can be, depending on the configuration of the vehicle, a dry clutch or a torque converter lockup clutch. Clutch 6 and the transmission 7 are actuated by an electronic transmission controller (EGS) 8, which is able to set various transmission ratios of the transmission 7. The shifting between the various transmission ratios is carried out automatically by means of the electronic transmission controller 8, by means of corresponding adjustment of the clutch 6 and of the actuators of the transmission 7, for example for the gate and gearspeed settings when the transmission 7 is embodied as an automatic manual-shift transmission. As an alternative to the transmission with fixed gearspeeds, a transmission with a continuously adjustable transmission ratio can also be used.

It is likewise immaterial whether the transmission 7 is embodied as a conventional automatic transmission with planetary wheel set, as an automated (automatic) manual shift transmission, or as a twin clutch transmission.

The drive train in FIG. 1 is connected to the wheels 9 of the motor vehicle via a differential (not shown). Only one wheel 9 is illustrated by way of example. Finally, a rotational speed sensor 10 is arranged in the drive train. The sensor continuously measures the current rotational speed N of the transmission output shaft 7A, or a comparable signal, such as the wheel speed or vehicle speed, and transfers it via a line 11 to a system-encompassing drive train management device (IPM) 12. The drive train management device 12 receives, as further input signals, inter alia via lines 13 and 14, signals which characterize the driver's request relating to a drive torque or a braking torque. These signals can be acquired, for example, by evaluating the settings of the accelerator pedal 15 or of the brake pedal 16. Furthermore, other signals from sensors 18 which are symbolically combined to form one block, and possibly also data from the decentralized control devices 2, 5 and 8, are fed to the drive train management device 12.

Data relating to a route to be traveled is also made available to the drive train management device 12 by an information management device 21 via a line 20. For this purpose, the information management device 21 has an input interface 22 for the destination or the target position of the motor vehicle to be input by the driver. The information management device 21 is connected via data interface 23 to a data source 24. The data source 24 has a digitized road map 25. The term "road map" is however not intended to be restrictive. In addition to information relating merely to the directional characteristics of roads, the digitized road map can also contain any other desired information relating to the route to be traveled. The available route information can be divided into three categories:

a) Information relating to the profile of the route, including both the horizontal characteristic (for example bends or turns), and the vertical characteristic (positive or negative gradients) are significant;

b) Information relating to the traffic control means, including in particular information which influences the travel speed of the motor vehicle, for example speed limits, stop signs, priority stipulations or place name signs, are of significance;

c) Information relating to the type and nature of the route, including freeways, country roads or roads passing through a locality, play a role in the control of the drive train. Other information relating to the nature of the route such as the road materials and state, e.g., asphalt, gravel, poor state of road, potholes, is desirable. Furthermore, information relating to sections of road the pass through in tunnels is of interest, since the switching on of the vehicle lights results in an increased energy demand during this portion of the route.

In addition to the road map 25, the data source 24 preferably has a traffic information source 26 which provides the current variables relating to the route to be traveled. The following information is possible:

a) information relating to the traffic flow (for example current congestion reports);

b) information relating to changes occurring to the condition of the road at a particular time (for example black ice);

c) information relating to current or expected weather influences, for example ones which effect visibility (precipitation, fog, weather forecast);

d) information relating to the current functional state of traffic control equipment (for example current traffic light phase); and e) information relating to unusual traffic regulations (for example temporarily closed-off roads or stipulations relating to low-emission operation for environmental reasons).

In addition, the data source 24 can have a close-range information source 27, for example in the form of a video camera in conjunction with an image processing system, or a radar system, which may be mounted on the vehicle. Using such a close-range information source 26 it is possible to obtain vehicle-specific information relating to the route being traveled. For example, obstacles on the route, in the simplest case a vehicle travelling ahead, can be detected. Additionally, information which has not been made available by the data sources 24 and 25, or has been made available incompletely or incorrectly, can be appropriately supplemented, corrected or replaced.

The route data supplied by the data sources 25, 26 and 27 is selected, combined, classified and/or compressed by the information management device 21. The information management device 21 additionally has an output interface 28 which makes it possible to convey visual or audible signals to the driver. Further, the information management device 21 determines the current position of the vehicle. One of the following methods, for example, or even a combination, is used to determine the most precise position of the vehicle possible:

a) position determination using GPS (Global Positioning System, satellite locating system);

b) compound navigation on the basis of current status data of the vehicle (yaw angle and the vehicle speed);

c) differential wheel sensor data;

d) compass data; and/or e) various map matching algorithms.

Data source 24 can be provided in the vehicle (on board), but may also be arranged entirely or partially outside the vehicle (off board). If the data source 24 is at least partially arranged outside the motor vehicle, the data is transmitted to the information management device 21 in wireless fashion, for example by radio transmission using GSM or UMTS signals. Within the motor vehicle, the data can be transmitted both by means of leads, for example in the form of a data bus system, as well as by means of wireless transmission technologies.

The drive train management device 12 determines the operating strategy in the form of setpoint states of the drive train as a function of the supplied signals. Possible setpoint states, for example "sailing", "extended sailing", "recuperative braking" or "boosting" are known, for example, from the prior application WO 02/26520 A1 and are therefore not described in detail at this point. In this context, the drive train management device 12 also defines the central operating parameters of the drive train, for example transmission ratios, and setpoint torques for the drive units, and also the method of driving and operating points. In order to implement the defined operating strategy, this information is fed to the decentralized controllers or control devices 2, 5 and 8 in the form of control signals.

The drive train management device 12 is connected via a bi-directional line 30 to an energy management device 31 (EPM)—EPM stands for Electrical Power Management. The energy management device 31 is connected to the energy accumulator 4 via a line 32. The energy management device 31 collects all the information relating to the current and future electrical energy demand and current and future load states of the electrical energy accumulator 4. The state of the energy accumulator is determined in a subfunction which is frequently referred to as battery monitoring. This function includes the determination of data relating to optimum and maximum power output and energy output, as well as optimum and maximum power drain and energy drain. In addition, the energy management device 31 controls the connection and disconnection into the circuit of all the electrical secondary loads in the motor vehicle such as window heaters, seat heaters, windshield wipers, lights, air-conditioning system and so on.

The controls or control devices 2, 5 and 8 generate actuation signals for the individual units or components of the drive train as a function of these control signals. The drive train management device 12, the information management device 21, and the energy management device 31 are represented in FIG. 1 as stand-alone control units. However, these devices can also be accommodated entirely, or partially, in a common control unit, or integrated into one or more of the decentralized controllers or control devices 2, 5 or 8. Likewise, the decentralized control devices 2, 5 and 8 are also represented as stand-alone control units. These units can, however, also be accommodated, combined in any desired fashion, in one or more multifunctional control units.

The control method according to the invention for the drive train of a hybrid vehicle is described below with reference to FIG. 2. In a step S1, the driver inputs the destination or the target position of the motor vehicle into the information management device 21 via the input interface 22. In response to a request signal of the drive train management device 12, the information management device 21 transfers, in a step S2, route data relating to the route to be traveled to the drive train management device 12. In a preferred embodiment, only data relating to a part of the route to be traveled is requested and transferred. The length of the part of the route, and thus the quantity of data is preferably dependent on the current load state of the energy accumulator 4, and/or on the storage capacity of the energy accumulator 4. At the end of the part of the route, or just before the end, the route data for the next route section is then requested by the drive train management device 12. Here too, the length of the part of the route, and thus the quantity of data, is again dependent on the load state of the energy accumulator 4 at the time of the data request.

As a function of the transferred route data for the requested route section and of the other input signals which characterize the current travel situation, the drive train management device 12 defines, in a step S3, an operating strategy for this route section which is optimum in terms of a quality function composed of overall efficiency, overall energy consumption and overall emissions. In this process, essentially the following operating parameters and system variables are determined:

a) setpoint states of the drive train, including the necessary switch-on and switch-off times for the internal combustion engine and the division of power between the internal combustion engine, electric motor and energy accumulator;

b) transmission ratio which has effects on the efficiency of the internal combustion engine and electric motor; and c) setpoint speed profile, i.e., all the route data which influences the anticipated travel speed is taken into account including speed restrictions, stop signs, roads passing through localities, congestion reports, bends, wet carriageway or black ice.

In a step S4, the drive train management device 12 determines the resulting energy demand as a function of the route data and the defined operating strategy. Depending on the route topology and predicted travel speed, the calculated energy demand can assume both positive values (-energy is consumed-) and negative values (-energy is generated). For the calculation of the energy demand, in particular the following are taken into account:

a) power to overcome the air resistance of the motor vehicle;

b) power to overcome the rolling resistance of the motor vehicle (frictional power);

c) power to overcome the climbing resistance; and d) power for the positive or negative acceleration of the vehicle.

The calculated energy demand value is then transferred to the energy management device 31 by the drive train management device 12 via the line 30 in a step S5. The energy management device 31 then calculates, in a step S6, a time period for which the requested energy demand can be made available. Here, the predicted energy demand for electrical secondary loads is also taken into account. For example, the energy consumption of the following components is thus taken into account:

a) vehicle lights in darkness, fog or in a tunnel;

b) air-conditioning system when there is strong solar radiation;

c) heating when the external temperature is low;

d) electric steering system or electric brake on bends; and e) active damping when the state of the road is poor.

In a preferred embodiment of the present invention, the energy management device 31 defines a type of control plan for the secondary electrical loads as a function of the energy demand value which is transferred. Here, account is taken in particular of the fact that some secondary loads, for example vehicle lights or windshield wipers must not be switched off automatically by the system, whereas other secondary loads, for example the seat heaters, can certainly be briefly deactivated in order to save energy in the short term. In this way, the energy consumption of the secondary electrical loads can be adapted to the energy demand required at a particular time, and the required energy demand can thus be made available for as long a time period as possible.

In a step S7, the calculated time period is signaled back to the energy management device 31. If the signaled-back time period is detected by the drive train management device 12 as not being sufficient to implement the optimum operating strategy for the predefined route section, the drive train management device 12 defines, in a step S8, an alternative operating strategy which leads to a lower energy demand. The energy demand which is then newly calculated (step 4) is then transmitted again to the energy management device 31 (step S5), and from there a corresponding newly calculated time period is signaled back (steps S6 and S7). This procedure is repeated until the signaled-back time period is detected as being sufficient by the drive train management device 12.

If an operating strategy which can be implemented is found in this way, it is implemented in a step S9 in such a way that the drive train management device 12 carries coordinated calculation of the central operating parameters of the drive train, and in doing so not only defines transmission ratios and setpoint torques for the drive units, but also the type of drive and operating points. This information is fed to the decentralized controllers or control devices 2, 5 and 8 in the form of control signals. The controls or control devices 2, 5 and 8 generate actuation signals for the individual units or components of the drive train as a function of these control signals.

If it is detected by the energy management device 31 that a lower or upper limiting value of the charge of the energy accumulator 4 is undershot or exceeded, a corresponding request signal is transmitted to the drive train management device 12. The drive train management device 12 can, depending on the priority of the request signal, take into account this information either during the definition of the operating strategy for the subsequent route section, or directly change the current operating strategy for the route section to be traveled at that instant by charging or discharging the energy accumulator as soon as possible.

If a change in the transferred route data occurs at a particular time, for example reported congestion on the route, or a change which has occurred to the quality of the roadway, for example due to rain, is detected by the information management device 21, the updated data is transferred, without being requested, to the drive train management device 12. Depending on the updated data, a new operating strategy which is adapted to the changed ambient conditions is then defined and the steps S4 to S9 are correspondingly passed through.

We claim:

1. A method for controlling a drive train in a hybrid vehicle comprising, requesting data which characterizes at least a portion of a route to be traveled; defining an operating strategy for individual components of the drive train as a function of said data; calculating expected energy consumption as a function of said data, and/or the defined operating strategy; determining a time period for which the calculated energy consumption can be made available; checking whether the time period which is determined is sufficient for the operating strategy; controlling the individual components of the drive train in accordance with the operating strategy where the time period is determined to be sufficient; and defining an alternative operating strategy and re-checking of the resulting time period if the time period is determined not to be being sufficient.

2. The method according to claim 1, wherein the data which characterizes at least a portion of the route to be traveled is requested from a data source when required.

3. The method according to claim 2, wherein the length of the portion of the route for which data is requested is dependent on the charge state of an energy accumulator and/or on storage capacity of the energy accumulator.

4. The method according to claim 1, wherein the operating strategy is defined as a function of one or more of the following, the efficiency of the individual components of the drive train, energy consumption, and emission values.

5. The method according to claim 1, wherein when a change in route data which has already been transferred is detected at a particular time, updated data is transferred and a new operating strategy is defined as a function of the updated data.

* * * * *